United States Patent
Ujiie

[11] 3,842,237
[45] Oct. 15, 1974

[54] WELDING METHOD EMPLOYING INCLINED PARALLEL GROOVE

[75] Inventor: Akira Ujiie, Kobe, Japan

[73] Assignee: Mitsubishi Jukogyo Kabushiki Kaisha, Tokyo, Japan

[22] Filed: July 27, 1973

[21] Appl. No.: 383,056

[30] Foreign Application Priority Data
Aug. 28, 1972  Japan.............................. 47-85295

[52] U.S. Cl..................... 219/135, 219/61, 219/126
[51] Int. Cl............................................. B23k 9/00
[58] Field of Search...................... 219/137, 126, 61

[56] References Cited
FOREIGN PATENTS OR APPLICATIONS
149,023   0/1962   U.S.S.R.............................. 219/137

Primary Examiner—J. V. Truhe
Assistant Examiner—Clifford C. Shaw
Attorney, Agent, or Firm—Cushman, Darby & Cushman

[57] ABSTRACT

A method of welding vertically arranged metallic members together by butt welding, comprising forming between the metallic members a groove defined by parallel groove faces and extending obliquely upwardly from the back side to the front side of said metallic members at a suitable angle of inclination to said metallic members, attaching a backing strip to the back side opening of said groove and thereafter forming beads in said groove successively from the lower end to the upper end thereof by arc welding thereby to weld said metallic members together.

10 Claims, 9 Drawing Figures

WELDING METHOD EMPLOYING INCLINED PARALLEL GROOVE

BACKGROUND OF THE INVENTION

1. FIELD OF THE INVENTION

This invention relates to a welding method employing an inclined parallel groove, and more specifically to a welding method adapted for use in the lateral (horizontal) welding.

2. DESCRIPTION OF THE PRIOR ART

In the past, V-, X-, H- and I-shaped grooves and modifications thereof have mainly been used in welding and arc welding in almost all cases has been performed by forming such grooves. In lateral (horizontal) welding in particular, a groove as shown in FIG. 1 has generally been used. In this case, it is essential, for obtaining a defect-free sound weld zone, to make small the cross-sectional area of each bead formed by one pass and to form the weld zone of a large number of beads by repeating the pass, so that there has been the disadvantage that the welding takes much time. On the other hand, when the welding is performed by forming a groove of small width as shown in FIG. 2, the cross-sectional shapes of the beads become anomalous, presenting the problem that a defect is liable to occur such as insufficient penetration of the deposited metal at the interfaces of the beads. Since such disadvantage or problem occurs regardless of whether the welding is performed automatically or manually, increasing the efficiency of the lateral welding has been extremely difficult.

SUMMARY OF THE INVENTION

The present invention is proposed with a view to eliminating the disadvantage or probem described above of the conventional welding methods and enhancing the efficiency of lateral (horizontal) welding or the like welding operations, and is concerned with a method of welding vertically arranged metallic members together by butt welding, comprising forming between the metallic members a groove defined by parallel groove faces and extending obliquely upwardly from the back to the front other side of said metallic members at a suitable angle to said metallic members, attaching a backing strip to the back side opening of said groove and thereafter forming beads in said groove from the lower end to the upper end thereof successively be arc welding thereby to weld said metallic members together.

DESCRIPTION OF THE PREFERRED EMBODIMENTS

An embodiment of the present invention will be described in detail hereunder with reference to FIGS. 3 through 7.

Figure 1:
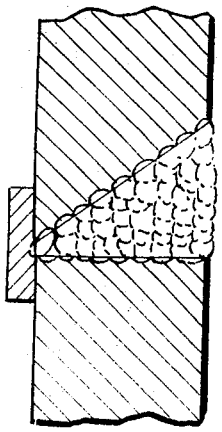
FIGS. 1 and 2 respectively are cross-sectional views briefly illustrating the conventional welding methods.
Figure 2:
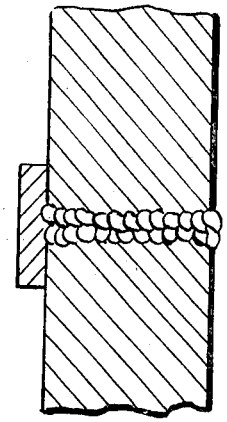
Figure 3:
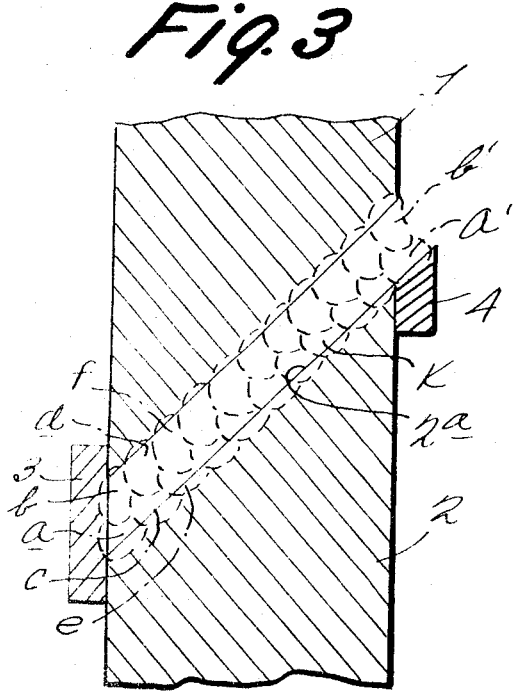
FIG. 3 is a cross-sectional view illustrating briefly an embodiment of the welding method according to the present invention.

In welding an upper metallic member 1 and a lower metallic member 2 laterally, an inclined parallel groove K defined by parallel groove faces and inclining obliquely upwardly from the back side to the front side of the metallic members is formed between said metallic members 1, 2 at first. Then, a backing strip 3 is attached to the back side opening of the groove K and a backing strip 4 to the lower metallic member 2 adjacent the front side opening of said groove. In this case, the upper end face of the backing strip 4 is formed to be flush with the inclined groove face 2a of the lower metallic member 2 as shown in FIG. 3. It has been confirmed through experiment that the angle of inclination of the groove K is preferably within the range of 35° to 60° to the surfaces of the metallic members 1, 2. Thereafter, beads are formed in the inclined parallel groove K, formed between the metallic members 1, 2 in the manner described, from the front side of said members successively in the order of beads $a, b, c, d, e, f \ldots$ ., as shown in FIG. 3, by arc welding.

Figure 4:
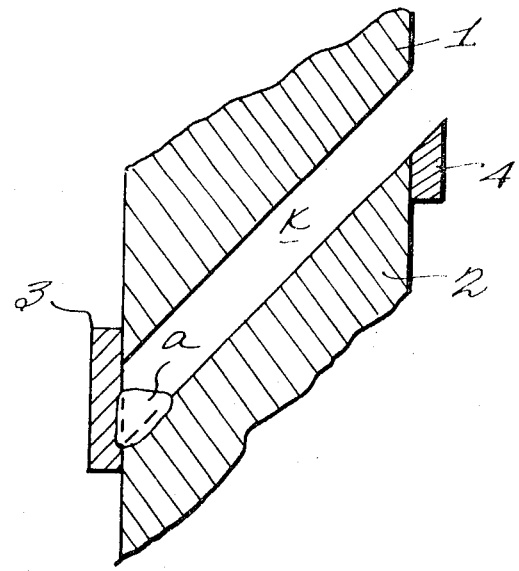
FIGS. 4 through 6 are diagrams illustrating sequentially the bead forming steps in the welding method shown in FIG. 3.
Figure 5:
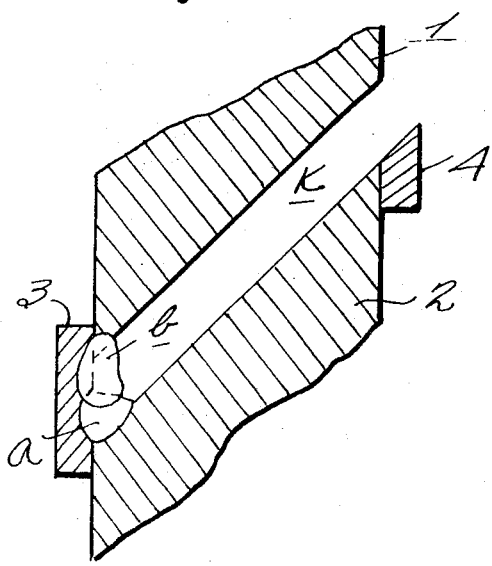
Figure 6:
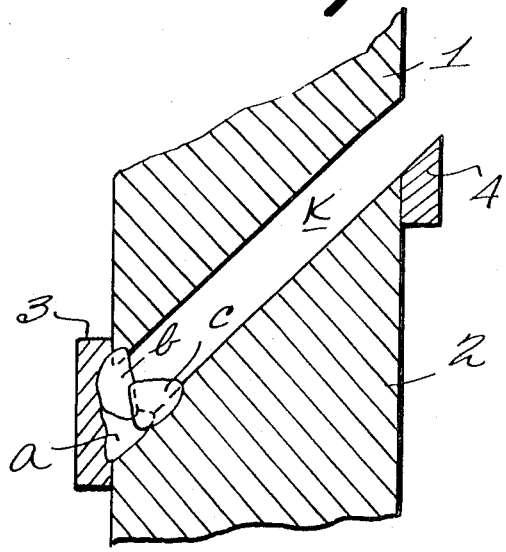
Figure 7:
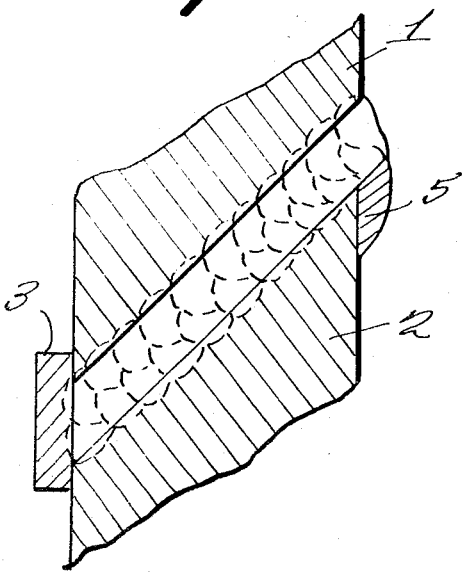
FIG. 7 is a diagram illustrating briefly another embodiment of the welding method of this invention.

In this case, the bead $a$ is formed mainly in the pocket-shapedportion defined by the lower metallic member 2 and the backing strip 3. Therefore, when the bead is formed, for instance, by $CO_2$ arc welding, it is formed spontaneously in an inverted triangular cross- section having a substantially flat upper surface, as shown in FIG. 4, under the effect of gravity. The bead $b$ is formed on top of the upper surface of the bead $a$ in a manner of fillet welding to fill the space between said upper surface and the upper metallic member 1, and therefore, has a cross-sectional shape as shown in FIG. 5. The bead $c$ is formed in the pocket-shaped portion defined by the front surface of the bead $b$, the upper surface of the bead $a$ and the lower metallic member 2, and therfore, has a cross-sectional shape similar to that of the bead $a$, as shown in FIG. 6. Thereafter, the beads $d, e, f \ldots$ . are similarly successively formed in the groove K as the welding proceeds and thus, the groove faces of the groove K are successively welded together. At the last stage of welding, beads $a', b'$ are formed similarly by making use of the front backing strip 4 attached to the lower metallic member 2, and thereafter said front backing strip 4 and a portion of the bead $a'$ are cut off. By this step, the welding of the upper and lower metallic members 1, 2 is completed. It is to be understood that, by forming a bead 5 on the lower metallic member 2 and shaping it into a suitable shape during machining of the groove faces of the groove K, as shown in FIG. 7, prior to the welding operation, the operation of cutting the front backing strip 4 and portion of the bead $a'$ upon completion of the welding can be eliminated.

According to the present invention, as described above, the inclined parallel groove is formed between the metallic members to be welded together, which is extending obliquely upwardly at a suitable angle to said metallic members and, after attaching the backing strip to the back side opening of said groove, the beads are formed in said groove successively from the lower end to the upper end thereof by arc welding, for welding said members together by butt welding. Therefore, the welding method of the invention has the following practical advantages:

1. Since the inclined parallel groove is employed, dripping of the beads does not occur even in case of lateral welding and, therefore, beads of substantially uniform and relatively large cross-sectional shapes can be obtained. Consequently, the efficiency of the welding operation can be increased even in the case when the welding is performed laterally, under the same conditions as when the welding is performed downwardly.

2. The welding efficiency can be further increased when the welding is performed automatically, as two adjoining beads such as the beads $a$ and $b$, the beads $c$ and $d$ or beads $e$ and $f$ can be formed in tandem and substantially concurrently.

Figure 8:
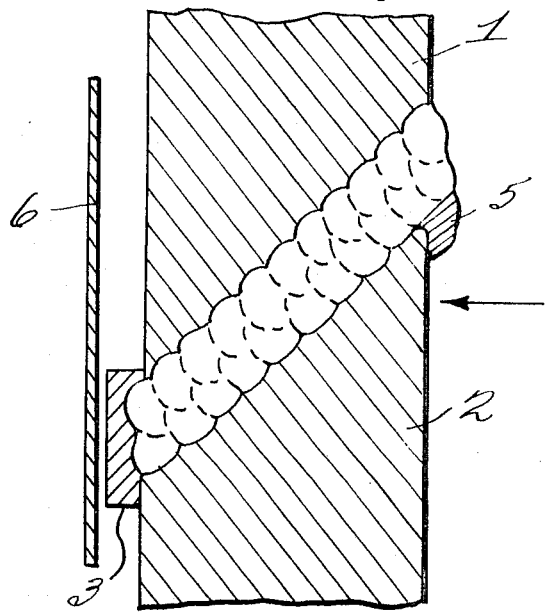
FIG. 8 is a diagram illustrating an arrangement for the radiographic inspection of the weld zone obtained by the welding method of the invention.

3. Since the weld zone is formed diagonally of the metallic members welded together, the positions of defects in the weld zone can be determined positively when the radiographic inspection of the weld zone is performed in the manner shown in FIG. 8, and accordingly, correction of the defects is easy. In FIG. 8, reference numeral 6 designates a radiographic inspection film and the arrow indicates the direction in which radiant rays are projected.

4. The groove is relatively simple in configuration and, therefore, can be formed easily by ordinary gas cutting.

5. Positioning of the groove faces for forming the groove can be achieved easily by use of a spacer and, therefore, the formation of a groove in the welding of large structures is easy.

6. The groove width can be reduced and a so-called narrow groove can be easily formed. Therefore, it is possible not only to enhance the welding efficiency but also to reduce the consumption of a welding rod. In addition, welding in any and all positions can be easily achieved.

Figure 9:
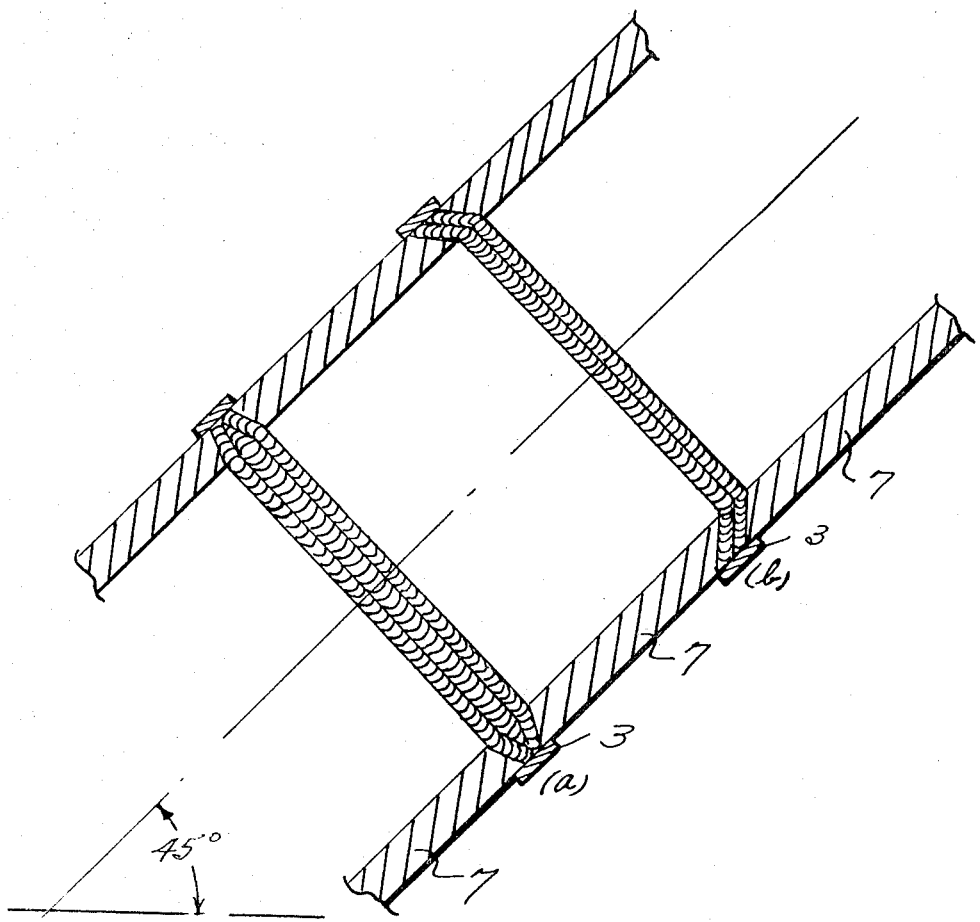
FIG. 9 is a diagram illustrating in comparison circumferential joints of inclined penstocks welded together by the conventional welding method and the welding method of the invention respectively.

FIG. 9 shows in comparison a welded joint (a) obtained by a conventional V-groove welding method and a welded joint (b) obtained by the welding method of this invention, when penstocks of a diameter of 3 – 4 meters, placed in a trench dug in a rock bed at an angle of inclination of 45°, were welded together circumferentially from the inside by the respective welding methods. As may be apparent from the welded joint (a), the V-groove welding according to the conventional method inevitably has involved all positions of welding including downhand welding, vertical welding and overhead welding. However, according to the welding method of this invention, as may be apparent from the welded joint (b), the ceiling portions of the penstocks can even be welded in a welding position close to horizontal welding position and the bottom portions thereof can be welded substantially in a downhand welding position, so that the welding positions involved in the welding of the entire circumference of the penstocks are only downhand position and horizontal position, and does not involve overhead position. Therefore, the application of the present invention to such a case is advantageous, not only in facilitating ease of automatization and increasing the efficiency of the welding operation, but also in minimizing defects of the weld zone and obtaining a quality weld zone, since the welding operation does not involve overhead welding which has been considered most difficult in automatic welding.

I claim:

1. A process for arc welding together the ends of two metallic members which have front sides and back sides, which ends are defined, in part, by end surfaces which are correspondingly obliquely inclined in a thickness sense, comprising:
    so arranging the two members that they extend generally vertically, one above the other, with said sides corresponding and said end surfaces substantially parallel and in vertical adjacency but spaced one above the other to define a groove which extends obliquely upwardly from a first opening at the back sides to a second opening at the front sides;
    positioning a backing strip securely against said back sides to bridge across said first opening;
    successively arc welding each of a plurality of beads in said groove, each bead extending along the length of the groove, the beads being deposited in a series preceding from the lower, first opening of the groove to the upper, second opening thereof, to substantially fill the groove.

2. The process of claim 1 wherein the last-recited step comprises:
    arc welding a first bead along the length of the groove, where the end surface of the lower one of said two members adjoins the backing strip;
    arc welding a second bead along the length of the groove upon the first bead, where the end surface of the upper one of said two members adjoins the backing strip; and
    arc welding a successive plurality of respectively succeeding beads along the length of the groove, alternating ones of said beads being deposited (a) upon and (b) forwardly of the immediately precedingly deposited ones of said beads, until said beads substantially fill said groove from the first opening to the second opening thereof.

3. The process of claim 2 wherein the respectively succeeding beads are formed in succeeding pairs, with each pair including one deposited at (a) and another deposited at (b), the two beads within each pair being deposited in tandem, that is, substantially concurrently, with the second of the beads within the pair beginning to be deposited before deposition of the first of the beads within the pair has been completed.

4. The process of claim 3 wherein each bead deposited at (a) is deposited as a downward fillet welding bead and each bead deposited at (b) is deposited as a horizontal fillet welding bead.

5. The process of claim 2 further including positioning a front backing strip securely against the front side of the lower one of the two members extending along the length of said groove at the second opening to function as a lip of said second opening, at least the next-to-last of the beads deposited being deposited at least in part upon said front backing strip, to provide support for the last of the beads to be deposited.

6. The process of claim 5 further comprising the terminal step of severing at least part of the front backing strip and at least part of said next-to-last bead, along the length of the substantially filled groove, from the welded article created by said process, after said last bead has been deposited.

7. The process of claim 4 wherein the end surfaces are inclined to said side surfaces of the metallic members at an angle within the range of 35°–60°.

8. A process for arc welding together the ends of two tubular metallic penstock members, in the field, the penstock members having radially inner, front sides and radially outer, back sides, and ends defined, in part, by end surfaces which are correspondingly obliquely inclined in a thickness sense, said process comprising:

so arranging the two members that they extend generally vertically, one above the other, with said sides corresponding and said end surfaces substantially parallel and in vertical adjacency but spaced one above the other to define a groove which extends obliquely upwardly from a first opening at the back sides to a second opening at the front sides;

positioning a backing strip securely against said back sides to bridge across said first opening;

successively arc welding each of a plurality of beads in said groove, each bead extending along the length of the groove about the circumference of the penstock members, the beads being deposited in a series proceeding from the lower, first opening of the groove to the upper, second opening thereof, to substantially fill the groove.

9. The process of claim 8 wherein the last recited step comprises:

arc welding a first bead along the length of the groove, where the end surface of the lower one of said two members adjoins the backing strip; and arc welding a successive plurality of respectively succeeding beads along the length of the groove, alternating ones of said beads being deposited (a) upon and (b) forwardly of the immediately precedingly deposited ones of said beads, until said beads substantially fill said groove from the first opening to the second opening thereof.

10. The process of claim 9 wherein the penstock members are sized on the order of 3–4 meters in diameter and the step of arranging the two members comprises:

digging a trench in a rock bed at an angle of inclination of about 45°; and placing the two members in the trench, one further therealong than the other.

* * * * *